US012754402B2

(12) United States Patent
Taylor et al.

(10) Patent No.: US 12,754,402 B2
(45) Date of Patent: Oct. 6, 2026

(54) LENS APPARATUS AND RELATED ASSEMBLIES AND VEHICLES FOR LASER IMAGING SYSTEMS

(71) Applicant: Rivian IP Holdings, LLC, Irvine, CA (US)

(72) Inventors: Mark Lennard Taylor, Laguna Beach, CA (US); Miguel Angel Ramirez Basilio, Aliso Viejo, CA (US); Deanna Marie Thiesmeyer, Laguna Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 293 days.

(21) Appl. No.: 18/504,704

(22) Filed: Nov. 8, 2023

(65) Prior Publication Data

US 2025/0147290 A1 May 8, 2025

(51) Int. Cl.

| | |
|---|---|
| ***G02B 13/14*** | (2006.01) |
| ***B60J 1/00*** | (2006.01) |
| ***G02B 7/02*** | (2021.01) |
| *B60J 1/02* | (2006.01) |

(52) U.S. Cl.
CPC .............. *G02B 13/14* (2013.01); *B60J 1/001* (2013.01); *G02B 7/02* (2013.01); *B60J 1/02* (2013.01)

(58) Field of Classification Search
CPC ............. G02B 13/14; G02B 7/02; B60J 1/001
See application file for complete search history.

(56) References Cited

PUBLICATIONS

CN 111890890 A (Shen, Jun-long et al.) machine translation (Year: 2020).*

Super Cruise—Hands Free Driving, Cadillac Ownership, https://www.cadillac.com/technology/super-cruise, retrieved on May 2, 2024.

* cited by examiner

*Primary Examiner* — James A Dudek
(74) *Attorney, Agent, or Firm* — Patterson + Sheridan, LLP

(57) ABSTRACT

The present disclosure relates to lenses, and related assemblies and vehicles, for laser imaging systems. In one or more embodiments, a lens assembly includes a view panel including an outer perimeter and an opening formed in the outer perimeter, and a lens positioned at least partially in the opening. The lens assembly includes a support structure attaching the lens to a second outer surface of the view panel.

17 Claims, 9 Drawing Sheets

LENS APPARATUS AND RELATED ASSEMBLIES AND VEHICLES FOR LASER IMAGING SYSTEMS

INTRODUCTION

Various vehicle systems involve the use of light-based devices. However, mounting light-based devices can be difficult. For example, mounting a light-based device on an outer side of a vehicle can make vehicle assembly difficult and time-consuming, and can undermine aesthetic appeal of the vehicle. As another example, one or more vehicle components can interfere with light transmission paths, which may hinder operation and calibration of the light device.

SUMMARY

The present disclosure relates to lenses, and related assemblies and vehicles, for laser imaging systems.

In one or more embodiments, a lens assembly includes a view panel including an outer perimeter, an opening formed in the outer perimeter, a first outer surface, and a second outer surface. The lens assembly includes a lens positioned at least partially in the opening. The lens assembly includes a support structure attaching the lens to the second outer surface of the view panel.

In one or more embodiments, a vehicle includes a vehicle body and a view panel mounted to the vehicle body. The view panel includes an outer perimeter and an opening formed in the outer perimeter. The vehicle includes a lens positioned at least partially in the opening.

In one or more embodiments, an infrared lens includes a first section, a second section spaced from the first section, and a plurality of angled sections extending between the first section and the second section. The plurality of angled sections at least partially define a recessed face. The plurality of angled sections include a first angled section oriented at a first angle relative to the first section, and a second angled section oriented at a second angle relative to the second section. The second angle is larger than the first angle.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting in scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to lenses, and related assemblies and vehicles, for a laser imaging system. In one or more embodiments, a lens assembly includes a view panel (such as a windshield or another structure, such as a window) including an opening formed in an outer perimeter thereof, and a lens positioned at least partially in the opening. The lens includes a recessed face that is recessed relative to a front face of the view panel. The lens assembly also includes a support structure that attaches the lens to a back face of the view panel. The lens includes one or more angled sections that at least partially define the recessed face. A laser module including a laser source is configured to emit light through at least one of the one or more angled sections of the lens, which has improved transmission characteristics with respect to light generated by the laser source as compared to the view panel. Transmitting the light through the lens enables more reliable light detection and ranging (LiDAR) operations and simplifies calibration of the laser source. Positioning the lens in the perimeter opening maintains an aesthetic appeal while simplifying both vehicle assembly and wiring.

The lens assembly is mounted to a vehicle. In one or more embodiments, the vehicle is an automotive vehicle, such as an electric vehicle (e.g., an electric truck, a sport-utility vehicle (SUV), or a service van) or an internal combustion vehicle.

The disclosure contemplates that terms used herein such as “attaches,” “attaching,” “attach,” “attached,” “couples,” “coupling,” “couple,” and “coupled” may include but are not limited to bonding, embedding, welding, fusing, melting together, interference fitting, and/or fastening such as by using bolts, threaded connections, pins, and/or screws. The disclosure contemplates that terms such as “attaches,” “attaching,” “attach,” “attached,” “couples,” “coupling,” “couple,” and “coupled” may include but are not limited to integrally forming. The disclosure contemplates that terms such as “attaches,” “attaching,” “attach,” “attached,” “couples,” “coupling,” “couple,” and “coupled” may include but are not limited to direct attaching or coupling and/or indirect attaching or coupling, such as indirect attaching or coupling through components such as links, blocks, and/or frames.

Figure 1:
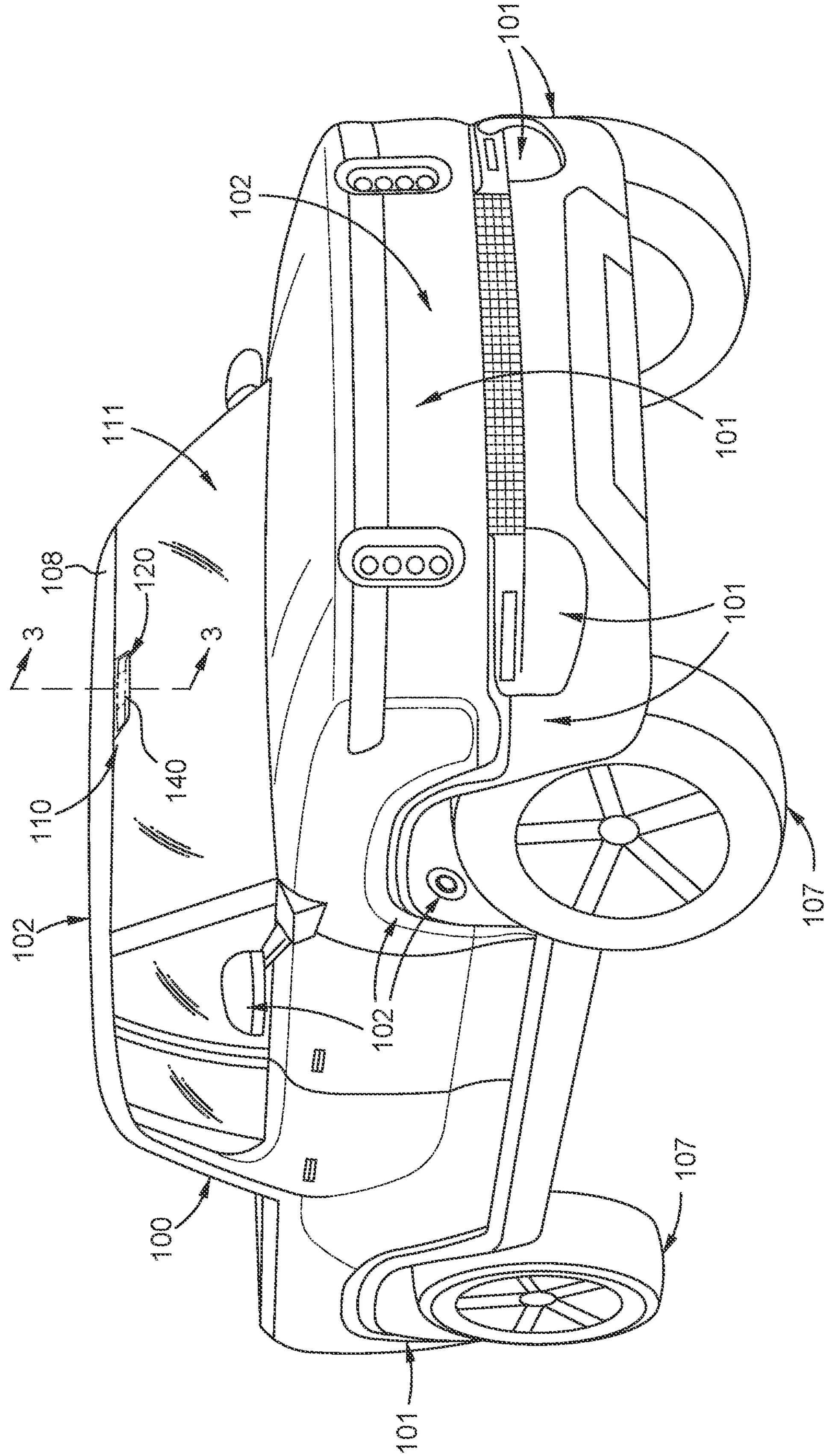
FIG. 1 is a schematic perspective view of a vehicle, according to one or more embodiments.

FIG. 1 is a schematic perspective view of a vehicle 100, according to one or more embodiments. The vehicle 100 may include multiple sensors 101 and/or multiple cameras 102. The vehicle 100 includes one or more wheel modules 107. In the implementation shown in FIG. 1, the vehicle 100 is a truck. The present disclosure contemplates that the subject matter described herein can be used in any other type of vehicle having any numbers of wheels, such as vans and/or SUVs.

A lens assembly 110 is mounted to the vehicle 100. The lens assembly 110 includes a view panel 111, a lens 120, and a laser source 141 and a sensor 142 positioned behind the lens 120. In one or more embodiments, the view panel 111 mounted to a vehicle body 108 of the vehicle 100.

Figure 2A:
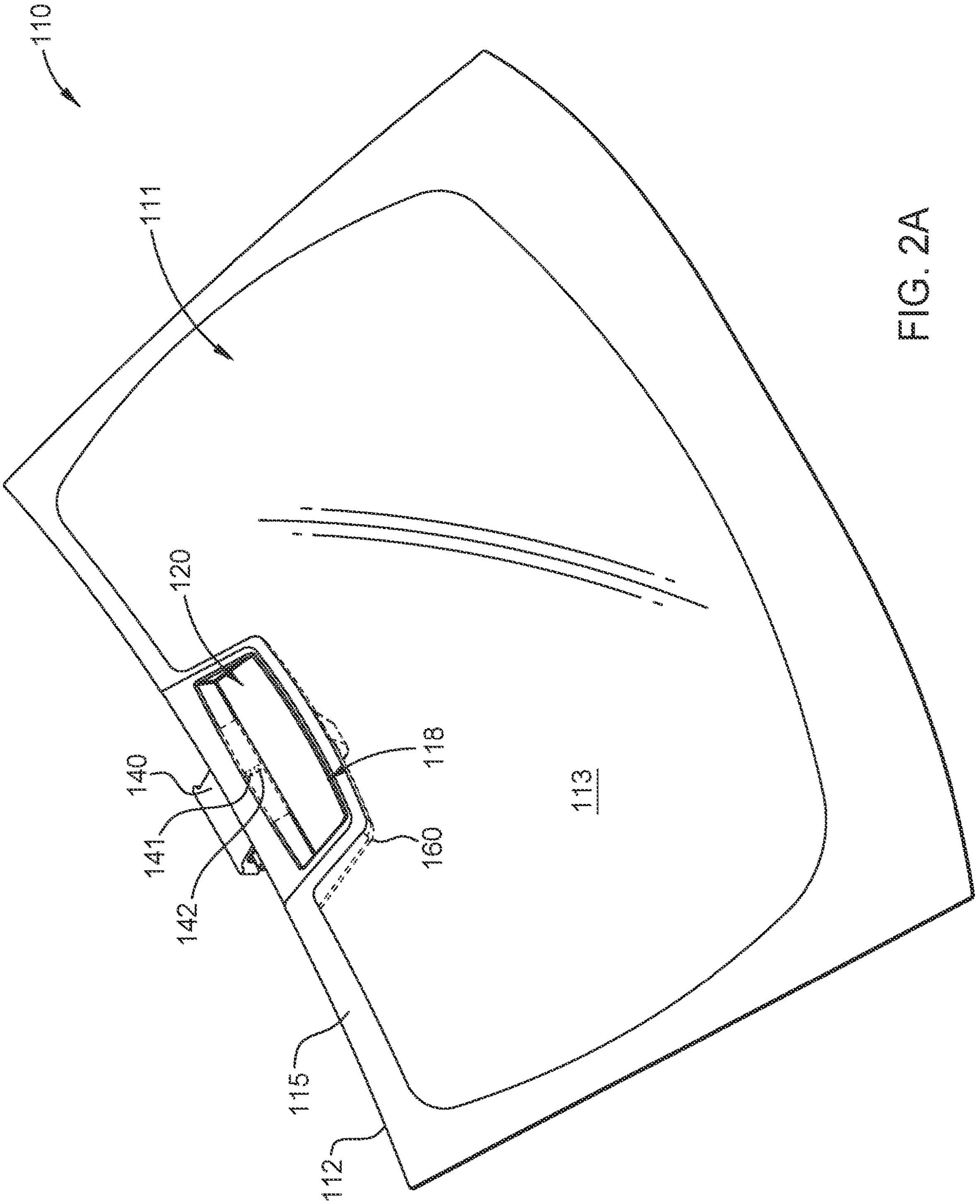
FIG. 2A is a schematic partial perspective front view of the lens assembly shown in FIG. 1, according to one or more embodiments.

FIG. 2A is a schematic partial perspective front view of the lens assembly 110 shown in FIG. 1, according to one or more embodiments. As shown, the view panel 111 includes an outer perimeter 112 and an opening 118 formed in the outer perimeter 112. In the implementation shown in FIG. 2A, the view panel 111 includes a windshield that includes a piece of laminated glass. The present disclosure contemplates that other materials (such as polycarbonate and/or tempered glass) can be used for the view panel 111.

Figure 2B:
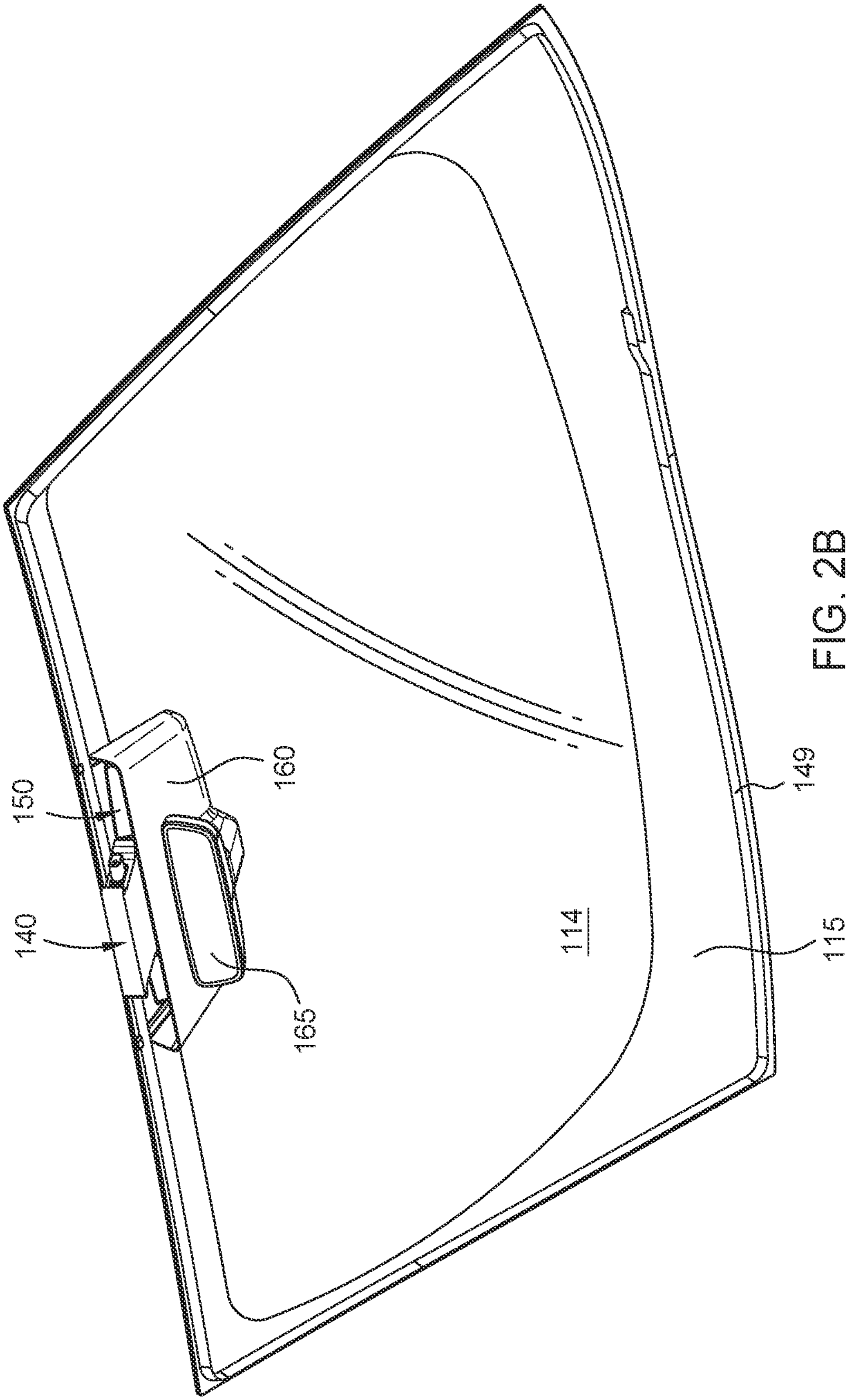
FIG. 2B is a schematic partial perspective back view of the lens assembly shown in FIG. 1, according to one or more embodiments.

FIG. 2B is a schematic partial perspective back view of the lens assembly 110 shown in FIG. 1, according to one or more embodiments.

Figure 3:
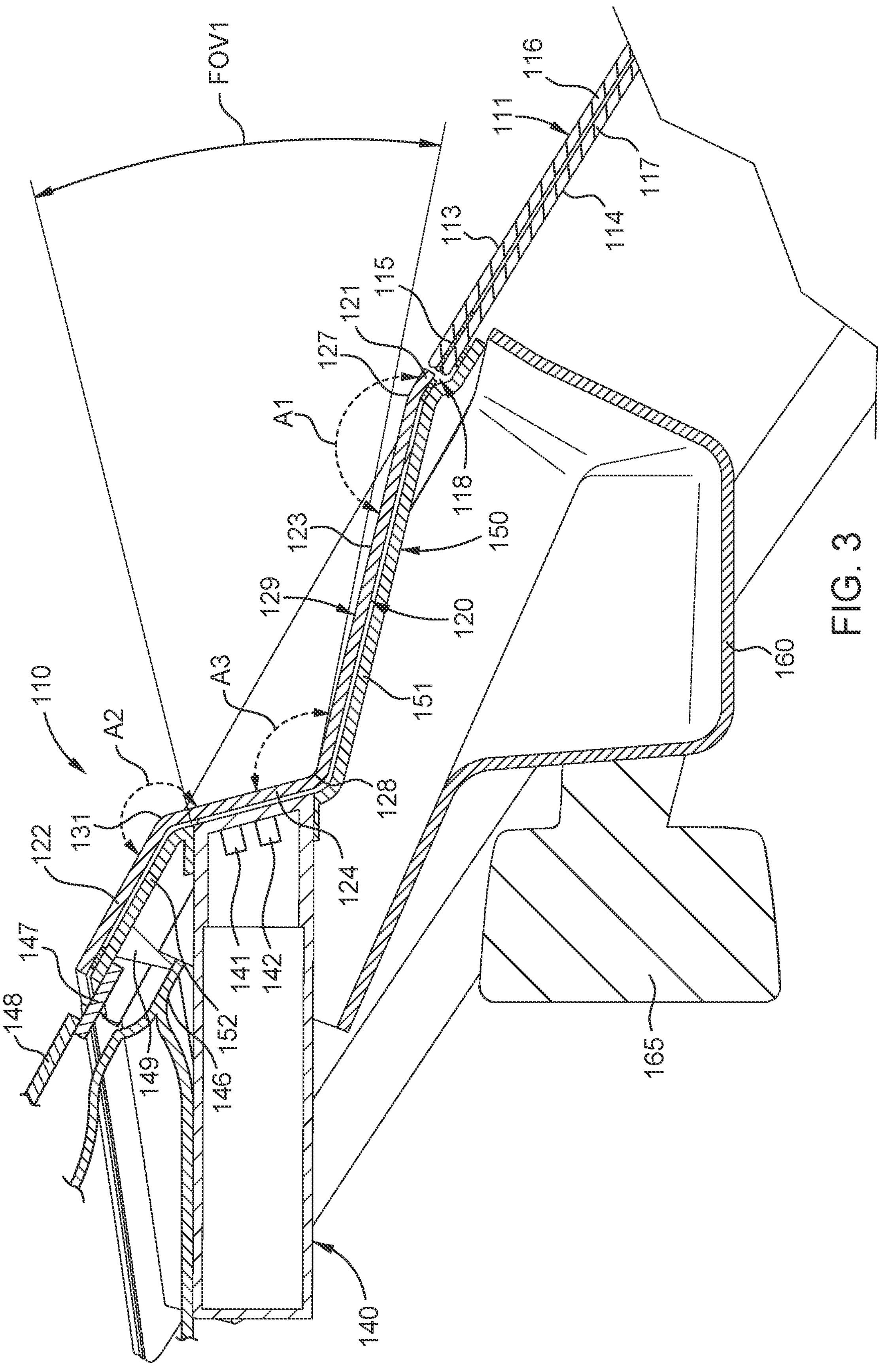
FIG. 3 is a schematic cross-sectional side view of the lens assembly along Section 3-3 shown in FIG. 1, according to one or more embodiments.

FIG. 3 is a schematic cross-sectional side view of the lens assembly 110 along Section 3-3 shown in FIG. 1, according to one or more embodiments.

The laser source 141 and the sensor 142 are part of a laser module 140. The lens 120 is positioned at least partially in the opening 118. In one or more embodiments, the lens 120 is an infrared lens. The lens 120 includes a recessed face 129 that is recessed relative to a first outer surface 113 of the view panel 111. The lens assembly 110 includes a support structure 150 attaching the lens 120 to a second outer surface 114 of the view panel 111. In one or more embodiments, the second outer surface 114 faces an interior of the vehicle 100 and the first outer surface 113 faces an exterior of the vehicle 100 when the lens assembly 110 is mounted to the vehicle 100.

The lens 120 includes a first section 121 and a second section 122 spaced from the first section 121 across the recessed face 129. The lens 120 includes one or more angled sections 123, 124 extending between the first section 121 and the second section 122. The one or more angled sections 123, 124 at least partially define the recessed face 129. In one or more embodiments, the one or more angled sections 123, 124 includes a plurality of angled sections. The one or more angled sections 123, 124 (two are shown in FIG. 3) include a first angled section 123 oriented at a first angle A1 relative to the first section 121, and a second angled section 124 oriented at a second angle A2 relative to the second section 122. The second angle A2 is greater than the first angle A1. The first angle A1 and the second angle A2 are obtuse. The second angled section 124 is oriented at a third angle A3 relative to the first angled section 123. The third angle A3 is less than the first angle A1, and the third angle A3 is less than the second angle A2. In one or more embodiments, the first angle A1 is 225 degrees or less. In one or more embodiments, the second angle A2 is within a range of 215 degrees to 250 degrees. In one or more embodiments, the third angle A3 is 90 degrees or greater. The present disclosure contemplates that one or more arcuate sections can be used in place of the one or more angled sections 123, 124. The present disclosure contemplates other values for the first angle A1, the second angle A2, and the third angle A3.

A first edge 127 transitions the first section 121 to the first angled section 123, a second edge 128 transitions the first angled section 123 to the second angled section 124, and a third edge 131 transitions the second angled section 124 to the second section 122. The edges 127, 128, 131 can be sharp edges, tapered edges, and/or arcuate edges.

The support structure 150 includes a first bracket section 151 attached to the first section 121 of the lens 120 and the second outer surface 114 of the view panel 111, and a second bracket section 152 attached to the second section 122 of the lens 120. The first bracket section 151 and the second bracket section 152 can be integrally formed together or can include two pieces coupled together. The lens assembly 110 includes a laser module 140 received at least partially in the support structure 150. The laser module 140 includes the laser source 141 oriented to emit light through at least one of the one or more angled sections 123, 124, and the sensor 142 oriented to sense reflected light through at least one of the one or more angled sections 123, 124. In one or more embodiments, the laser source 141 is oriented to emit light through the second angled section 124, and the sensor 142 is oriented to sense reflected light through the second angled section 124. In one or more embodiments, the light is infrared radiation (IR) having a wavelength in the IR range. In one or more embodiments, the light is collimated into laser beams. In one or more embodiments, the sensor 142 is part of a camera configured to capture images and sense reflected light in the images. The laser module 140 is configured to emit light and receive reflected light along a field of view FOV1. The present disclosure contemplates that the components of the lens assembly 110 can be attached to each other using bonding, such as bonding using adhesive between interfacing surfaces of components.

At least part of the lens 120 (such as at least the second angled section 124) has a higher transmissivity for IR light than the view panel 111. In various embodiments, at least part of the lens 120 (such as at least the second angled section 124) includes quartz and/or borosilicate glass.

In some embodiments, at least part of the lens 120 (such as at least the second angled section 124) has a higher quartz and/or borosilicate glass content than the view panel 111. In one or more embodiments, one or more of the first angled section 123 or the second angled section 124 is formed of a composition that includes a silicon dioxide ($SiO_2$) atomic percentage of at least 75%. In one or more embodiments, the $SiO_2$ atomic percentage is at least 99%, such as 99.99% (4 N) or higher, for example 99.999% (5 N) or higher. In one or more embodiments, one or more of the first angled section 123 or the second angled section 124 is formed of a composition that includes a borosilicate atomic percentage of at least 75%. In one or more embodiments, the borosilicate atomic percentage is at least 99%, such as 99.99% (4 N) or higher, for example 99.999% (5 N) or higher.

A cover panel 160 is attached to the second outer surface 114 and at least partially covers the support structure 150 and the lens 120 on backsides thereof. A rearview device 165 is attached to the cover panel 160. The rearview device 165 can include, for example, a mirror and/or a display. A pad 149 (such as an elastomer or foam pad) is disposed along the second outer surface 114 of the view panel 111 and a backside of the second bracket section 152. The second bracket section 152 is attached to a metal panel 148 of the vehicle body 108 using an attachment panel 147. The lens assembly 110 can abut against a second metal panel 146 of vehicle body 108 using the pad 149.

In one or more embodiments, and as described above, the view panel 111 includes a piece of laminated glass that includes a ceramic layer 115 positioned between two glass layers 116, 117. As shown in FIG. 2A, the ceramic layer 115 is arranged along the outer perimeter 112 and inwardly of the opening 118. In one or more embodiments the ceramic layer 115 includes polyvinyl butyral (PVB). A first glass layer 116 includes the first outer surface 113 and a second glass layer 117 includes the second outer surface 114. The lens 120 is shown as positioned at least partially in the opening 118 of the view panel 111. The view panel 111 is shown as a windshield. However, the present disclosure contemplates that the lens 120 and the laser module 140 can be used in relation to other view panel structures (such a rear window or a side window of the vehicle 100). As an example, the view panel 111 (shown as a windshield) can be replaced with a window having the opening 118, and the lens 120 can be positioned at least partially in the opening 118 formed in the window. In one or more embodiments, the window includes tempered glass.

Figure 4:
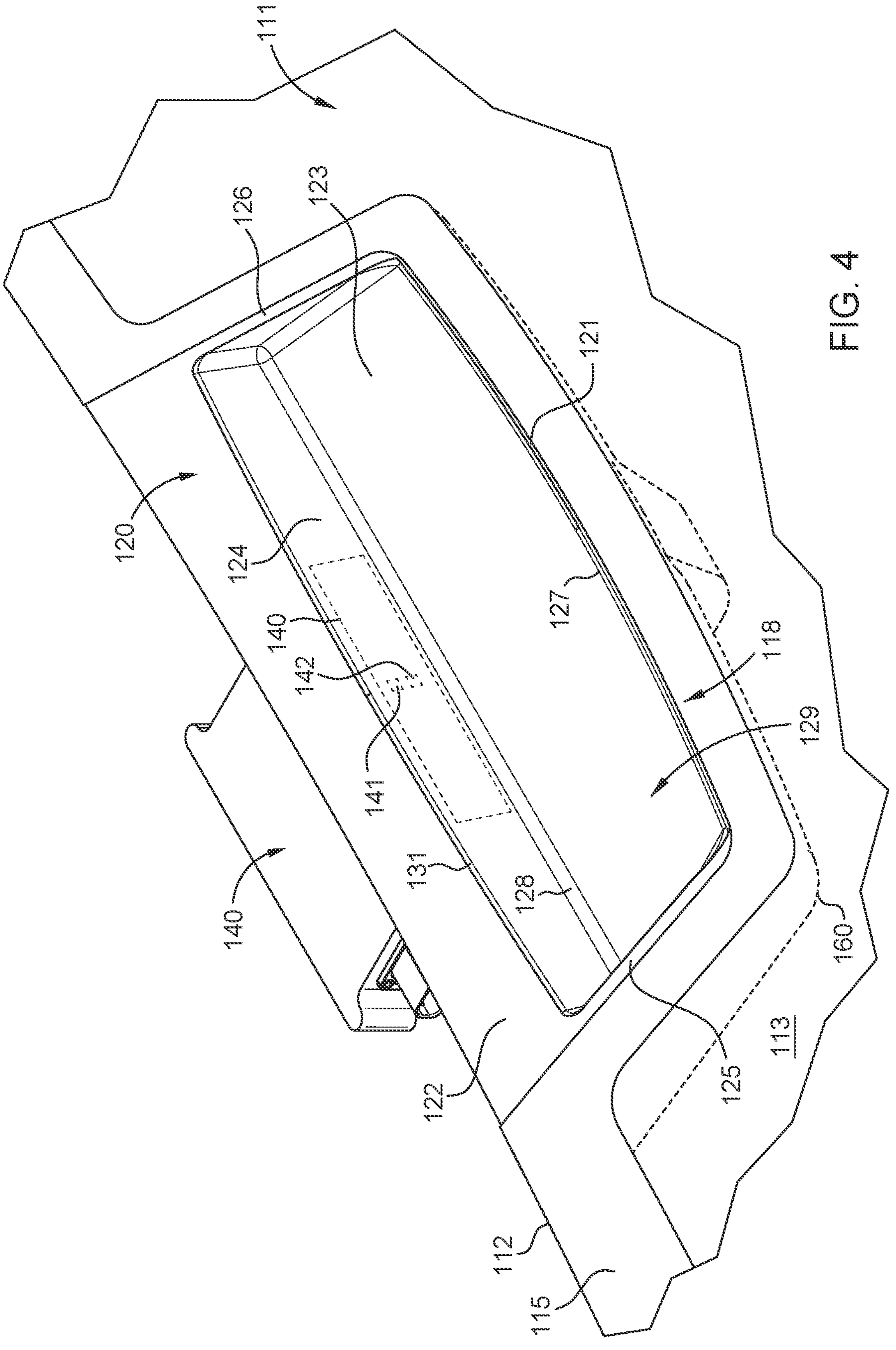
FIG. 4 is a schematic enlarged perspective view of the lens assembly shown in FIG. 2A, according to one or more embodiments.

FIG. 4 is a schematic enlarged perspective view of the lens assembly 110 shown in FIG. 2A, according to one or more embodiments. The vehicle body 108 is not shown in FIG. 4.

The lens 120 includes a first side section 125 and a second side section 126 spaced from the first side section 125 across the recessed face 129. The first section 121, the second section 122, the first side section 125, and the second side section 126 surround the recessed face 129.

Figure 5:
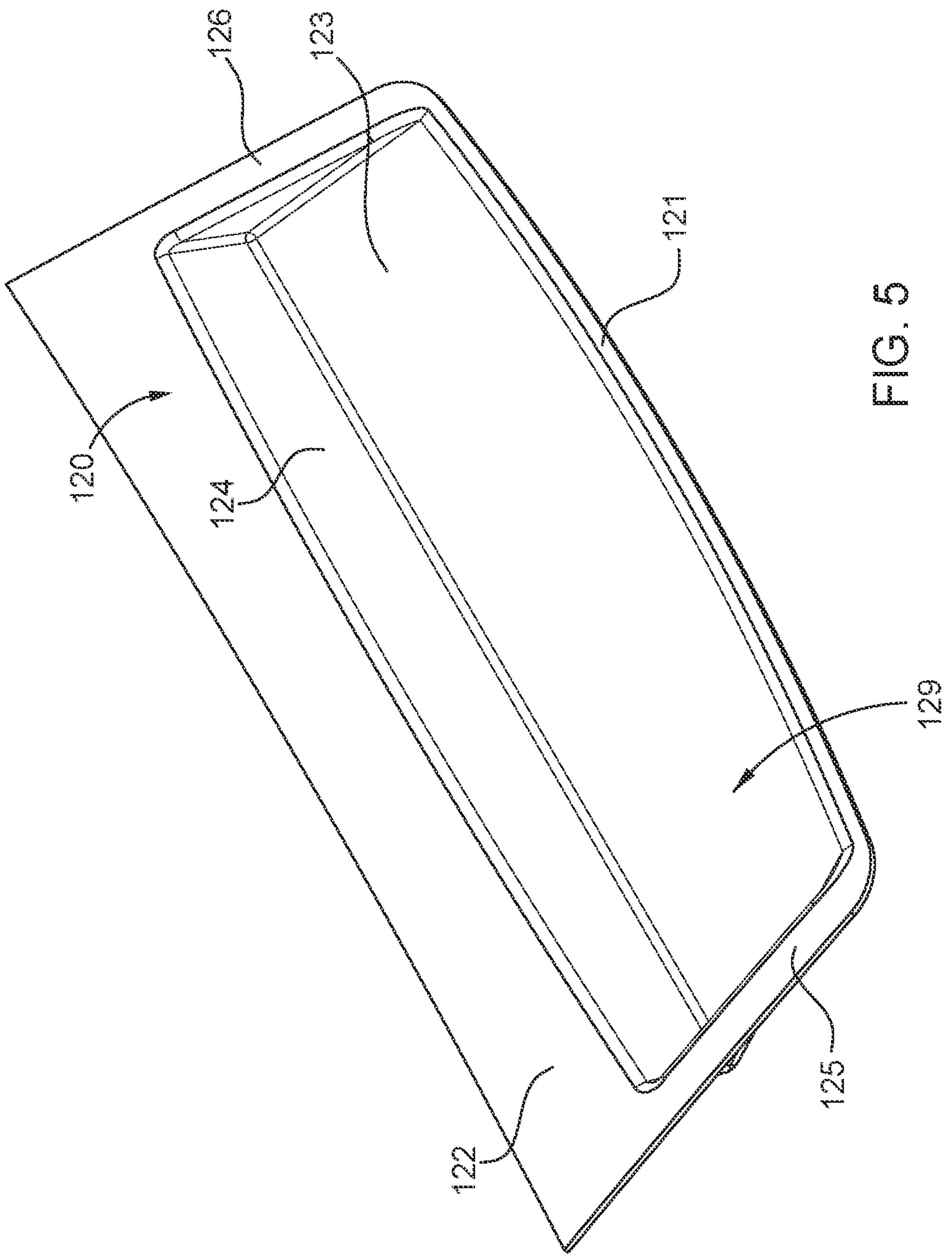
FIG. 5 is a schematic perspective front view of the lens shown in FIGS. 1-4, according to one or more embodiments.

FIG. 5 is a schematic perspective front view of the lens 120 shown in FIGS. 1-4, according to one or more embodiments. The view in FIG. 5 is from above the lens 120.

Figure 6:
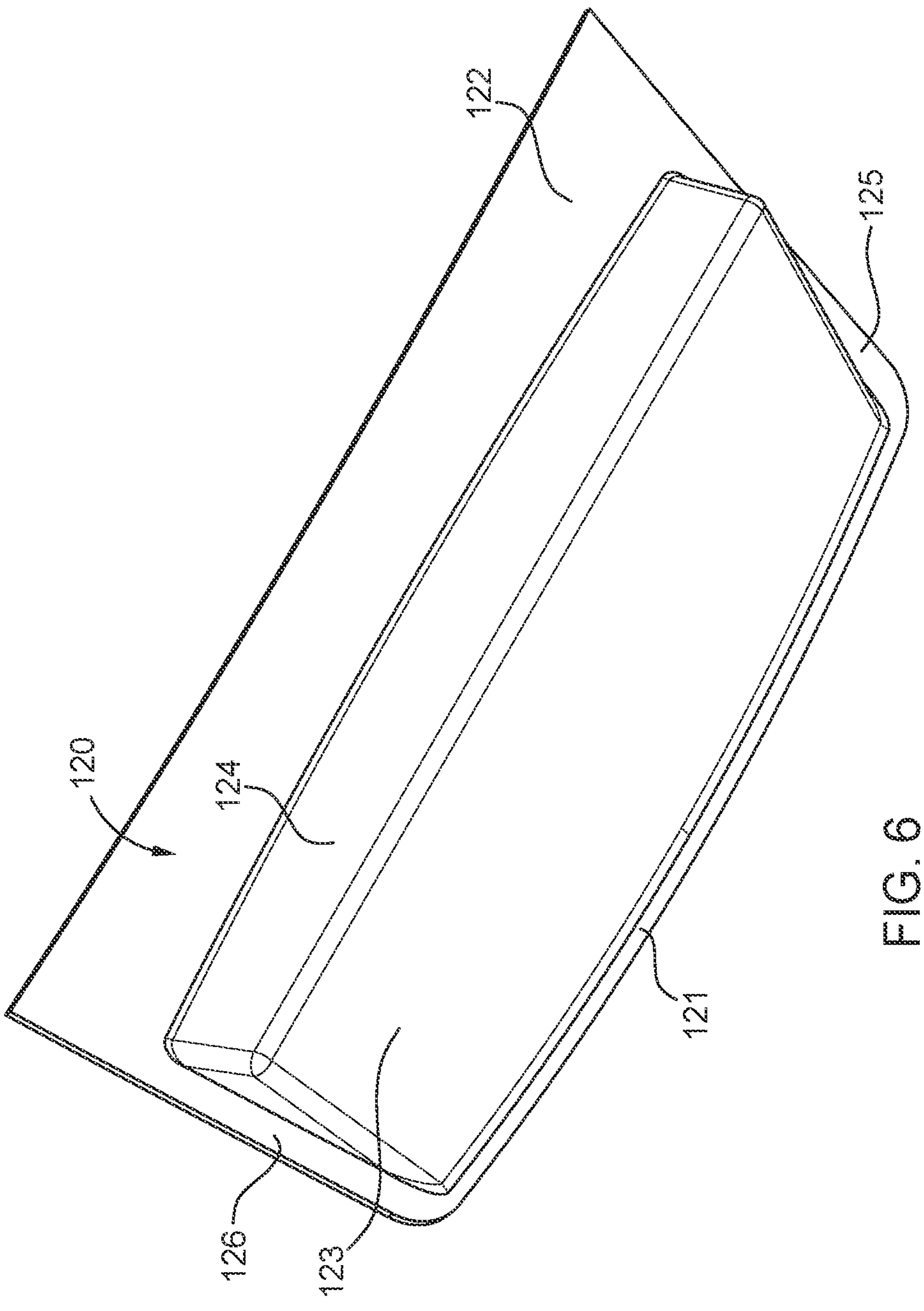
FIG. 6 is a schematic perspective back view of the lens shown in FIG. 5, according to one or more embodiments.

FIG. 6 is a schematic perspective back view of the lens 120 shown in FIG. 5, according to one or more embodiments. The view in FIG. 6 is from below the lens 120. As shown in FIG. 6, the first angled section 123 and the second angled section 124 protrude relative to the first section 121, the second section 122, the first side section 125, and the second side section 126.

Figure 7:
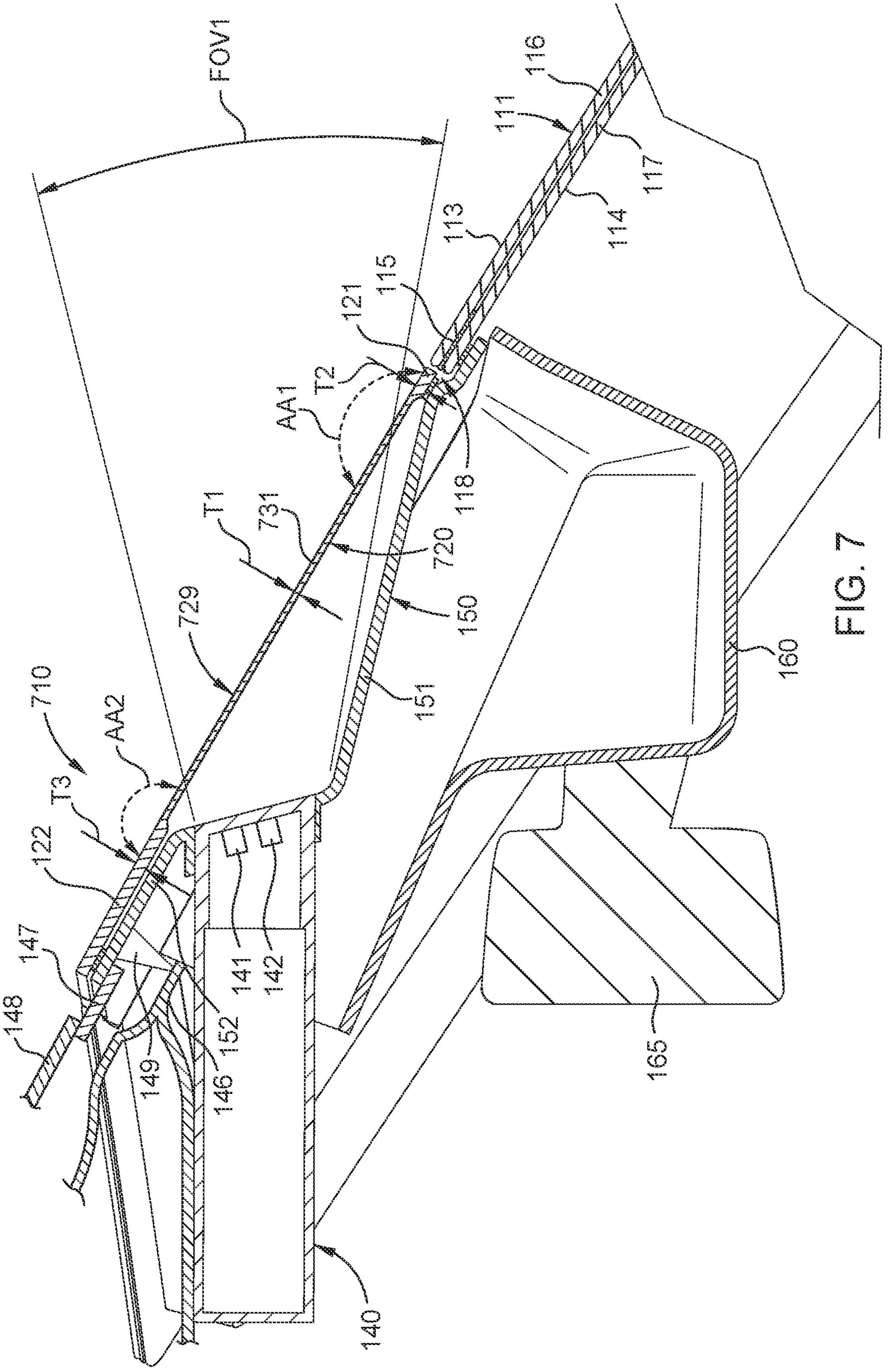
FIG. 7 is a schematic cross-sectional side view of a lens assembly, according to one or more embodiments.

FIG. 7 is a schematic cross-sectional side view of a lens assembly 710, according to one or more embodiments. The lens assembly 710 is similar to the lens assembly 110 shown in FIG. 3 and includes one or more aspects, features, components, operations, and/or properties thereof.

The lens assembly includes a lens 720. The lens 720 is similar to the lens 120 and includes one or more aspects, features, components, operations, and/or properties thereof. The lens includes a middle section 731 extending between the first section 121 and the second section 122. The lens 720 includes a face 729. In one or more embodiments, the face 729 is coplanar with the first outer surface 113 of the view panel 111. The middle section 731 is oriented at a first angle AA1 relative to the first section 121 and a second angle AA2 relative to the second section 122. In one or more embodiments, the first angle AA1 and the second angle AA2 are within a range of 175 degrees to 185 degrees, such as about 180 degrees. In one or more embodiments, the middle section 731 is oriented at the same angle as the view panel 111.

The middle section 731 has a first thickness T1 that is less than a second thickness T2 of the first section 121 and a third thickness T3 of the second section 122. In one or more embodiments, the first thickness T1 of the middle section 731 is half or less (such as one-third or less) of the respective second thickness T2 and third thickness T3. The thickness T1 facilitates reduced refractivity of the middle section 731. The second thickness T2 and the third thickness T3 can be equal to or different from each other. In one or more embodiments, the first thickness T1 is less than 2.0 mm, such as within a range of 0.5 mm to 1.5 mm. In one or more embodiments, the second thickness T2 is 2.0 mm or higher, such as within a range of 2.0 mm to 3.5 mm. In one or more embodiments, the third thickness T3 is 2.0 mm or higher, such as within a range of 2.0 mm to 3.5 mm. Other values are contemplated for the thicknesses T1, T2, T3.

In one or more embodiments, the face 729 and the first outer surface 113 are arcuate and have the same radius of curvature.

Figure 8:
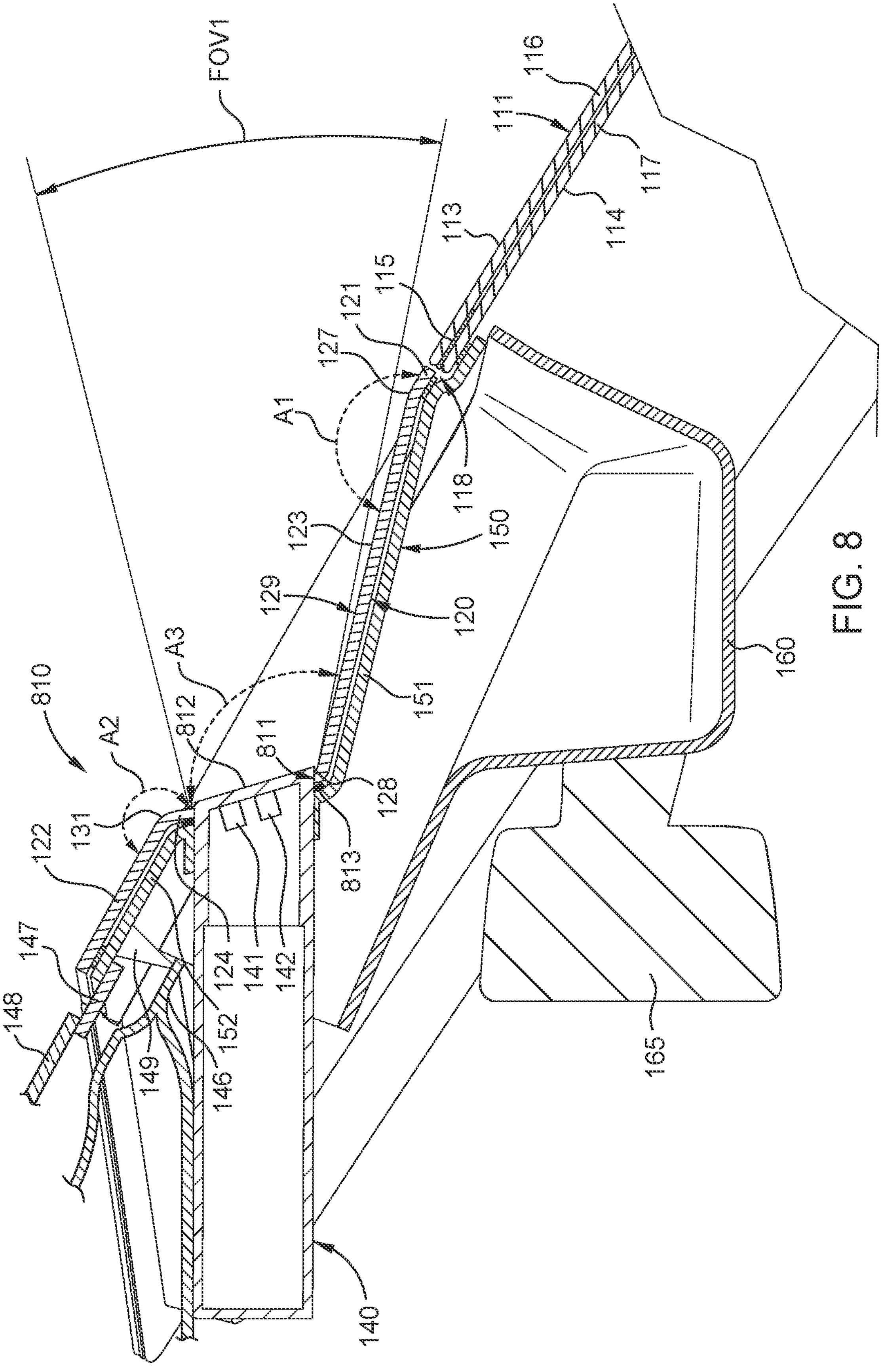
FIG. 8 is a schematic cross-sectional side view of a lens assembly, according to one or more embodiments.

FIG. 8 is a schematic cross-sectional side view of a lens assembly 810, according to one or more embodiments. The lens assembly 810 is similar to the lens assembly 110 shown in FIG. 3 and includes one or more aspects, features, components, operations, and/or properties thereof.

In the lens assembly 810 shown in FIG. 8, an opening 811 (e.g., a through-hole) is formed in the second angled section 124 of the lens 120, and the laser module 140 is positioned at least partially in the opening 811. In one or more embodiments, the laser module 140 extends through the opening 811 such that a front face 812 of the laser module 140 extends past the opening 811. The front face 812 can be part, for example, of a lens (such as a LiDAR lens) of the laser module 140. One or more seals 813 (such as watertight seal(s)) are positioned between the lens 120 and the first and second bracket sections 151, 152 of the support structure 150.

In various embodiments, benefits of the present disclosure include easily and quickly mounting the lens assembly 110 to the vehicle body 108 for laser imaging operations; enhancing aesthetic appeal of vehicles; reliable light transmission paths; reliable and accurate operation and calibration of laser imaging devices; and ease of calibration of laser imaging devices. Benefits also include ease of coupling electrical power and/or data connections to the laser imaging devices. For example, electrical wiring need not be passed through to an exterior of the vehicle to connect to the laser module 140 during or after the mounting of the lens assembly 110 to the vehicle body 108.

It is contemplated that one or more aspects disclosed herein may be combined. As an example, one or more aspects, features, components, operations and/or properties of the vehicle 100, the lens assembly 110, the lens 120, the view panel 111, the lens assembly 710, the lens 720, the lens assembly 810, and/or the opening 811 may be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof, and the scope thereof is determined by the claims that follow.

What is claimed is:

1. A lens assembly comprising:

a view panel comprising an outer perimeter, an opening formed in the outer perimeter, a first outer surface, and a second outer surface;

a lens positioned at least partially in the opening, the lens comprising:

a first section;

a second section; and one or more angled sections extending between the first section and the second section, the one or more angled sections at least partially defining a recessed face that is recessed relative to the first outer surface of the view panel, and the second section spaced from the first section across the recessed face; and a support structure attaching the lens to the second outer surface of the view panel.

2. The lens assembly of claim 1, wherein the one or more angled sections comprise:

a first angled section oriented at a first angle relative to the first section; and a second angled section oriented at a second angle relative to the second section, wherein the second angle is larger than the first angle.

3. The lens assembly of claim 2, wherein the first angle and the second angle are obtuse.

4. The lens assembly of claim 3, wherein:

the second angled section is oriented at a third angle relative to the first angled section, the third angle is less than the first angle, and the third angle is less than the second angle; and the first angle is 225 degrees or less, and the second angle is within a range of 215 degrees to 250 degrees.

5. The lens assembly of claim 1, further comprising:

a laser module received at least partially in the support structure, wherein the laser module includes a laser source oriented to emit light through at least one of the one or more angled sections.

6. The lens assembly of claim 5, wherein the at least one of the one or more angled sections comprises an opening, and the laser module is positioned at least partially in the opening.

7. The lens assembly of claim 1, wherein the lens comprises:

a first section;

a second section; and a middle section extending between the first section and the second section, the middle section having a first thickness that is less than a second thickness of the first section and a third thickness of the second section.

8. A vehicle, comprising:

a vehicle body;

a view panel mounted to the vehicle body, the view panel comprising an outer perimeter and an opening formed in the outer perimeter; and a lens positioned at least partially in the opening, the lens comprising:

a first section, a second section, and one or more angled sections extending between the first section and the second section, the one or more angled sections at least partially defining a recessed face that is recessed relative to a first outer surface of the view panel, wherein the second section is spaced from the first section across the recessed face.

9. The vehicle of claim 8, wherein the view panel further comprises a ceramic layer positioned between two glass layers, wherein the ceramic layer is arranged along the outer perimeter and inwardly of the opening.

10. The vehicle of claim 8, wherein the one or more angled sections comprise:

a first angled section oriented at a first angle relative to the first section; and a second angled section oriented at a second angle relative to the second section, wherein the second angle is larger than the first angle.

11. The vehicle of claim 10, wherein the first angle and the second angle are obtuse.

12. The vehicle of claim 8, further comprising a support structure attaching the lens to a second outer surface of the view panel, wherein the support structure is attached to the first section of the lens, the second section of the lens, and the second outer surface of the view panel.

13. The vehicle of claim 12, further comprising:

a laser module received at least partially in the support structure, wherein the laser module includes a laser source oriented to emit light through at least one of the one or more angled sections.

14. The vehicle of claim 13, wherein the at least one of the one or more angled sections comprises an opening, and the laser module is positioned at least partially in the opening.

15. The vehicle of claim 8, wherein the lens comprises:

a first section;

a second section; and a middle section extending between the first section and the second section, the middle section having a first thickness that is less than a second thickness of the first section and a third thickness of the second section.

16. The lens assembly of claim 1, wherein the one or more angled sections comprise:

a first angled section oriented at a first angle relative to the first section; and a second angled section oriented at a second angle relative to the second section, wherein the first angle and the second angle are obtuse, and one or more of the first angled section or the second angled section is formed of a composition that includes a silicon dioxide ($SiO_2$) atomic percentage of at least 75%.

17. The lens assembly of claim 16, wherein the second angled section is oriented at a third angle relative to the first angled section, the third angle is less than the first angle, and the third angle is less than the second angle.

* * * * *